United States Patent
Doherty

(10) Patent No.: US 8,047,182 B2
(45) Date of Patent: Nov. 1, 2011

(54) FUEL DELIVERY SYSTEM FOR HEATING FUEL THEREIN

(75) Inventor: Robert J. Doherty, Syracuse, IN (US)

(73) Assignee: Millenium Industries, Ligonier, IN (US)

( * ) Notice: Subject to any disclaimer, the term of this patent is extended or adjusted under 35 U.S.C. 154(b) by 425 days.

(21) Appl. No.: 12/367,846

(22) Filed: Feb. 9, 2009

(65) Prior Publication Data

US 2009/0199822 A1 Aug. 13, 2009

Related U.S. Application Data

(60) Provisional application No. 61/028,358, filed on Feb. 13, 2008.

(51) Int. Cl.
*F02G 5/00* (2006.01)
*F02M 69/46* (2006.01)

(52) U.S. Cl. ........................................ 123/456; 123/557

(58) Field of Classification Search .................. 123/456, 123/543, 549, 557
See application file for complete search history.

(56) References Cited

U.S. PATENT DOCUMENTS

| 3,762,378 | A | * | 10/1973 | Bitonti | 123/557 |
| 4,754,741 | A | * | 7/1988 | Houtman | 123/552 |
| H001820 | H | * | 12/1999 | Graves et al. | |
| 7,481,205 | B2 | * | 1/2009 | Keeler et al. | 123/549 |
| 7,669,585 | B2 | * | 3/2010 | Haag et al. | 123/456 |
| 2009/0107473 | A1 | | 4/2009 | Imoehl et al. | |
| 2009/0133676 | A1 | * | 5/2009 | Lepsch et al. | 123/549 |

FOREIGN PATENT DOCUMENTS

WO 2006130938 A1 12/2006

\* cited by examiner

*Primary Examiner* — Thomas Moulis
(74) *Attorney, Agent, or Firm* — Dykema Gossett PLLC

(57) ABSTRACT

A fuel delivery system comprises a fuel rail having a flow channel therein. The fuel delivery system further comprises a fuel injector cup that includes a base at a first end thereof, an opening at a second end thereof opposite the first end, and an inner cavity disposed between the base and the opening. The first end of the fuel injector cup is configured to be disposed within the flow channel of the fuel rail. The fuel delivery system further comprises a heating element. The fuel rail of the fuel delivery system further includes a port therein that is configured for receiving the heating element. Additionally, the fuel injector cup of the fuel delivery system further includes an aperture therein also configured for receiving the heating element.

22 Claims, 2 Drawing Sheets

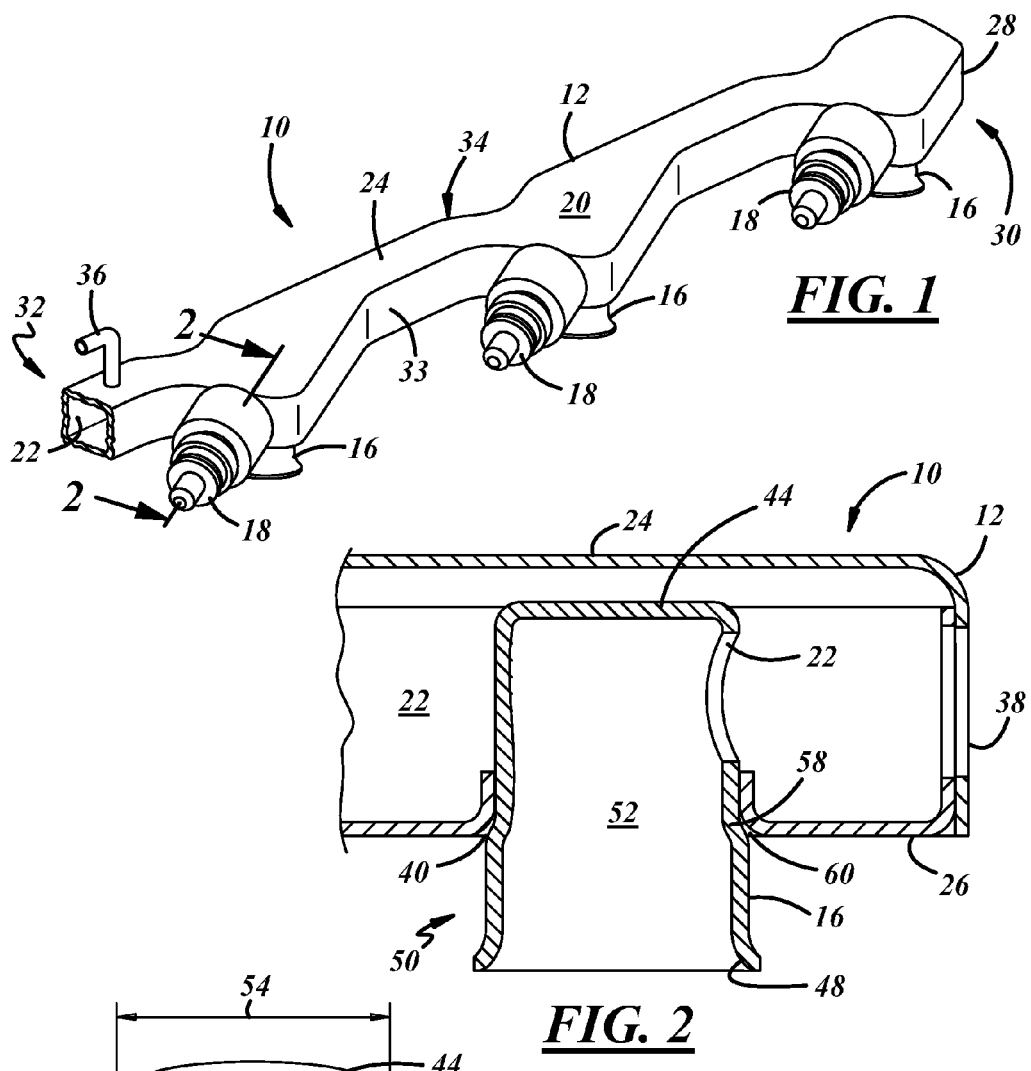
FIG. 1
FIG. 2
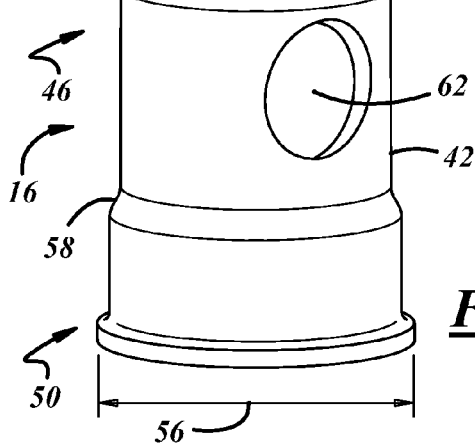
FIG. 3

FUEL DELIVERY SYSTEM FOR HEATING FUEL THEREIN

CROSS REFERENCE TO RELATED APPLICATIONS

This application claims the benefit of U.S. Provisional Application Ser. No. 61/028,358 entitled "System and Method for Heating Fuel in a Fuel System," which was filed on Feb. 13, 2008, and which is hereby incorporated by reference in its entirety.

FIELD OF THE INVENTION

The field of the present invention is fuel delivery systems. More particularly, the present invention relates to a system and method of heating fuel in fuel delivery systems, for example, vehicular fuel delivery systems.

BACKGROUND OF THE INVENTION

Fuel delivery systems for various vehicular applications, such as, for example, fuel-injected engines used in various types of on-road and off-road vehicles, typically include one or more fuel rails having a plurality of fuel injectors and fuel injector cups associated therewith. Some of these applications utilize fuel having a high alcohol content. For example, engines for certain automobiles and light trucks may operate on 100% ethanol fuel.

One downside of using this type of fuel is that in certain conditions (e.g., cold weather) the engine may be difficult to start due to the temperature of the fuel. One attempt at combating the "cold-fuel" problem involves heating the fuel before it is supplied to the fuel injector upon the starting of the engine.

For example, one known system includes a fuel rail having a plurality of outlets and a equal number of fuel injector cups associated with the outlets. When assembled, each fuel injector cup has a fuel injector disposed therein. Fuel from the fuel rail is communicated through the respective outlet to the fuel injector inlet disposed within the injector cup. To heat the fuel in this system, a separate component is affixed to the inner surface of the fuel rail proximate each outlet to create a heating chamber or volume for that particular outlet. A heating element is positioned within the chamber, and the component is configured to allow fuel from the flow channel of the fuel rail to flow into the chamber. Accordingly, the heating element heats the fuel in the chamber, and that fuel is then supplied to the fuel injector disposed within the injector cup corresponding to the respective outlet. Accordingly, a small volume of fuel is heated and supplied to the corresponding fuel injector to improve quick startability.

Such systems are not without their disadvantages, however. For example, in the system described above, the heating-chamber component is an additional component that must be added to the system. As such, the cost increases and the manufacturability of the system becomes more difficult. Additionally, the interface between the heating-chamber component and the inner surface of the fuel must be sealed to avoid the intrusion of cold fuel into the heating chamber. Again, this results in additional components being required, and accordingly, the cost and difficulty of manufacturability increases.

Therefore, there is a need for a fuel delivery system that will minimize and/or eliminate one or more of the above-identified deficiencies.

SUMMARY OF THE INVENTION

The present invention is directed to a fuel delivery system. In one aspect of the invention, the fuel delivery system comprises a fuel rail having a flow channel therein, a fuel injector cup, and a heating element. The fuel injector cup includes a base at a first end thereof, an opening at a second end thereof opposite the first end, and an inner cavity disposed between the base and the opening. Additionally, the first end of said fuel injector cup is configured to be disposed within the flow channel of the fuel rail.

The fuel rail of the fuel delivery system further includes a port therein that is configured to receive at least a portion of the heating element. Similarly, the injector cup of the fuel delivery system further includes an aperture therein that is likewise configured to receive at least a portion of the heating element.

The present invention is also directed to a method of assembling the inventive fuel delivery system. In a first step, a fuel rail having a flow channel, a port, and an opening therein is provided. In a second step, a fuel injector cup having a base disposed at a first end thereof, an opening disposed at a second end thereof opposite the first end, and an inner cavity disposed between the base and the opening is provided. The fuel injector cup provided in this step further includes an aperture therein that is proximate the base of the injector cup. In a third step, a heating element is provided.

In a fourth step of the method, the first end of the fuel injector cup is positioned within the flow channel of the fuel rail. In an exemplary embodiment, this step includes inserting the first end of the injector cup through the opening in the fuel rail. In a fifth step, the fuel injector cup is affixed to the fuel rail. In a sixth step, the heating element is inserted through the port in the fuel rail, through the aperture in the fuel injector cup, and into the inner cavity of the fuel injector cup.

Further features and advantages of the present invention, including the constituent components thereof, will become more apparent to those skilled in the art after a review of the invention as it is shown in the accompanying drawings and detailed description.

BRIEF DESCRIPTION OF THE DRAWINGS

FIG. 1 is a perspective view of an exemplary embodiment of a fuel delivery system in accordance with the present invention.

FIG. 2 is a cross-sectional view of a portion of the fuel delivery system illustrated in FIG. 1 with the fuel injector and heating element removed taken along the lines 2-2 in FIG. 1.

FIG. 3 is a perspective view of an exemplary embodiment of the fuel injector cup of the fuel delivery system illustrated in FIGS. 1 and 2 in accordance with the present invention.

DETAILED DESCRIPTION OF PREFERRED EMBODIMENTS

Figure 4:
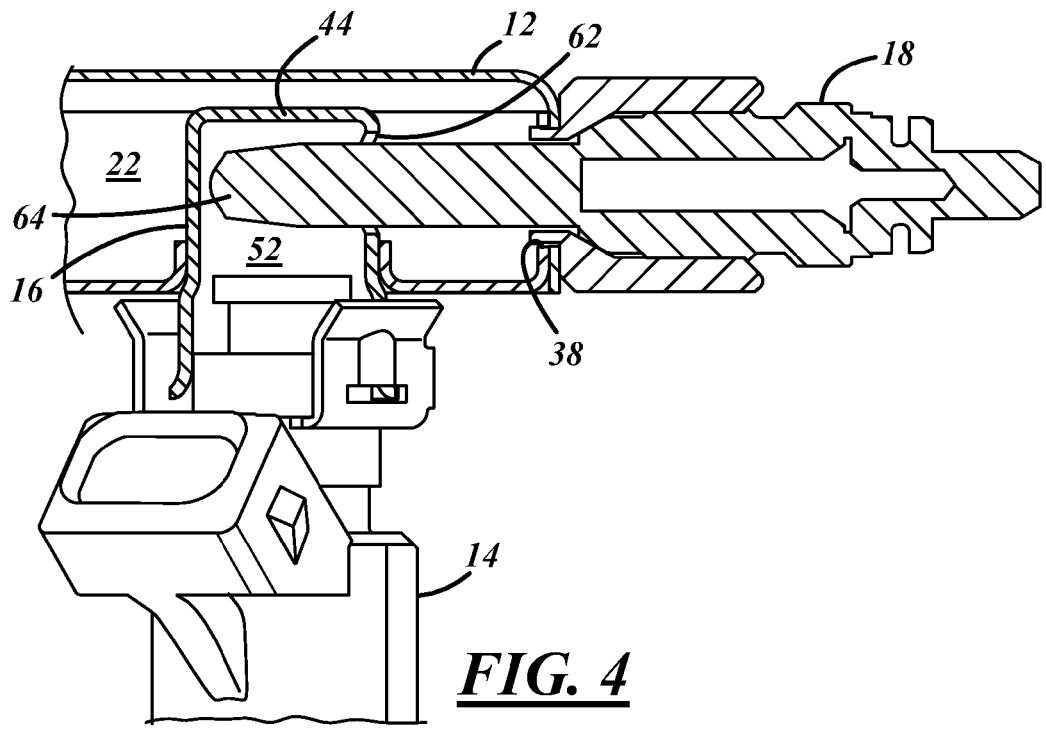
FIG. 4 is partial cross-sectional view of a portion of the fuel delivery system illustrated in FIGS. 1 and 3 taken along the lines 4-4 in FIG. 1.

Referring now to the drawings wherein like reference numerals are used to identify identical components in the various views, FIG. 1 illustrates one exemplary embodiment of a fuel delivery system 10. Fuel delivery system 10 is configured for use with, for example, applications utilizing fuel having a high alcohol content. In applications having an engine that is powered by fuel having a high alcohol content, it is sometimes difficult to start the engine in cold conditions. By heating the fuel in the fuel delivery system, starting can be improved. Accordingly, fuel delivery system 10 generally includes a fuel rail 12, a fuel injector 14 (best shown in FIG. 4), a fuel injector cup 16, and a heating element 18.

With reference to FIGS. 1 and 2, fuel rail 12 comprises a body 20 having a flow channel 22 therein. In an exemplary embodiment, fuel rail 12, and body 20, in particular, includes a first or top side 24, a second or bottom side 26 that is substantially parallel to top side 24, and a four additional sides disposed between top side 24 and bottom side 26 to define flow channel 22. More particularly, fuel rail 12 includes a third side 28 and a fourth side 29 that are disposed at a first end 30 and a second end 32 of fuel rail body 20, respectively, and a fifth side 33 and a sixth side 34 that each extend between first end 30 and second end 32 of fuel rail 12. In an exemplary embodiment, third and fourth sides 28, 29 are parallel with each other and perpendicular with top and bottom sides 24, 26. Similarly, in an exemplary embodiment, fifth and sixth sides 33, 34 are parallel to each other and perpendicular to top and bottom sides 24, 26, as well as third and fourth sides 28, 29. It should be noted, however, that the respective sides need not be exactly or substantially parallel or perpendicular to each other as described above. Rather, in other exemplary embodiments, the various respective sides may not be exactly parallel or perpendicular with each other but still combine together to form or define flow channel 22. Additionally, the present invention is not meant to be limited to any one type of fuel rail construction. For example, in an exemplary embodiment, body 20 is formed of two or more pieces (e.g., stamped pieces) that are assembled together to form body 20. However, in another exemplary embodiment, body 20 is of a unitary, tubular construction having any number of cross-sectional shapes, such as, for example and without limitation, circular, rectangular, and other like shapes. Such embodiments remain within the spirit and scope of the present invention.

As best shown in FIG. 1, fuel rail 12 further comprises an inlet 36 in body 20 in fluid communication with flow channel 22. Inlet 36 is configured to be coupled to a fuel source or supply, such as, for example, the fuel tank or fuel pump of a vehicle. In an exemplary embodiment, inlet 36 is disposed in top side 24 of fuel rail 12. However, in other exemplary embodiments, inlet 36 may be disposed in bottom side 26 or any of sides 28, 29, 33, and 34.

As best shown in FIG. 2, and as will be described in greater detail below, fuel rail 12 also comprises a port 38 disposed in fuel rail body 20. Port 38 is configured to receive heating element 18, such as, for example, a glow plug, that is inserted through port 38 and into flow channel 22. In an exemplary embodiment, fuel rail 12 further comprises at least one opening 40 in body 20. As will be described in greater detail below, opening 40 provides access to flow channel 22 and is configured to receive at least a portion of fuel injector cup 16 such that a portion of fuel injector cup 16 is disposed within flow channel 22. Additionally, in an exemplary embodiment, opening 40 is disposed in bottom side 26 of fuel rail 12, and port 38 is disposed in either fifth or sixth sides 33, 34 adjacent to opening 40. It should be noted, however, that such an arrangement is provided for exemplary purposes only and is not meant to be limiting nature. In other exemplary embodiments, port 38 may be disposed in other sides/locations of fuel rail 12. When fuel system 10 is assembled, flow channel 22 is configured to allow for the communication of fuel between inlet 36 and fuel injector cup 16, and therefore, between the fuel source or supply of system 10 and fuel injector 14, which is associated with fuel injector cup 16.

Fuel rail 12 may be formed of any number of materials, such as, for example, metal (e.g., aluminum, stainless steel, etc.), thermoplastics, or a combination of the two. Additionally, fuel rail 12 may also be constructed in a number of ways. As described above, in an exemplary embodiment, fuel rail 12 is comprised of two or more pieces (e.g., stampings) that are affixed together to form fuel rail 12. However, in another exemplary embodiment, fuel rail 12 may comprise a single piece having a tubular-like construction, for example. Accordingly, the present invention is not limited to any one single fuel rail construction and/or shape.

With reference to FIGS. 2 and 3, fuel injector cup 16 will be described. In an exemplary embodiment, fuel injector cup 16 comprises cylindrically-shaped body 42 having a base 44 disposed at a first end 46 thereof, an opening 48 disposed at a second end 50 thereof opposite base 44, and an inner cavity 52 disposed in injector cup body 42 therebetween. It should be noted, however, that while injector cup 16 is described herein as having a cylindrically-shaped body, the present invention is not limited to such an embodiment. Rather, in other exemplary embodiments, fuel injector cup body 42 may have any number of shapes defining an inner cavity. Accordingly, the present invention is not limited to a fuel injector cup having a cylindrically-shaped body.

Additionally, fuel injector cup 16 may be formed of a number of different materials. In an exemplary embodiment, fuel injector cup 16 is formed of metal (e.g., aluminum, aluminum alloys, stainless steel, etc.). However, in another exemplary embodiment, fuel injector cup 16 may be formed of a thermoplastic material, or a combination of metal and thermoplastics.

As illustrated in FIG. 2, first end 46 of fuel injector cup body 42, including base 44, is configured to be disposed within flow channel 22 of fuel rail 12. In an exemplary embodiment, fuel injector cup 16 is a separate and distinct component from fuel rail 12. In this embodiment, first end 46 of fuel injector cup 16 is inserted through opening 40 in fuel rail body 20. Once injector cup 16 is inserted within opening 40, it may be affixed to body 20 using known affixation methods (e.g., various welding and/or brazing operations, crimping, mechanical fasteners, and any other known and/or like method). It should be noted that as illustrated in FIG. 2, in an exemplary embodiment, fuel injector cup 16 is substantially perpendicular to fuel rail body 20 (i.e., the longitudinal axis thereof) when inserted through opening 40 in fuel rail body 20. However, in another exemplary embodiment, fuel injector cup 16 is canted relative to an axis that is perpendicular to fuel rail body 20 (i.e., the longitudinal axis thereof).

In an exemplary embodiment, second end 50 of injector cup body 42, and a portion thereof proximate injector cup opening 48, in particular, is configured to be disposed external to flow channel 22. This portion of injector cup 16 is configured to receive fuel injector 14. More particularly, injector cup opening 48 is sized to as to allow the inlet portion of fuel injector 14 to be inserted therein. In an exemplary embodiment, fuel injector cup 16 is further configured for mating with a fuel injector retention clip associated with fuel injector 14. The coupling or mating of a retention clip, a fuel injector, and a fuel injector cup serves to retain fuel injector 14 within injector cup 16. Fuel injector retention clips and coupling/mating arrangements between a retention clip, a fuel injector, and a fuel injector cup are well-known in the art, and therefore, will not be described in great detail here.

With reference to FIG. 3, in an exemplary embodiment, injector cup body 42 has a constant outer diameter throughout its length. However, in another exemplary embodiment, different portions of injector cup body 42 have different outer diameters. For instance, as illustrated in FIGS. 2 and 3, in an exemplary embodiment, first end 46 of injector cup body 42 proximate base 44 has a first outer diameter 54, while second end 50 of injector cup body 42 proximate opening 48 has a second, larger outer diameter 56. In such an embodiment, first outer diameter 54 is sized such that base 44 can be inserted into opening 40 of fuel rail body 20. Conversely, second outer diameter 56 is sized such that the insertion of fuel injector cup 16 into opening 40 is limited. More specifically, second outer diameter 56 is larger than the diameter of opening 40, while first outer diameter 54 is substantially equal to or less than the diameter of opening 40. In an exemplary embodiment, the change in outer diameter of injector cup body 42 is a gradual change and defines a transitional conical or tapered section 58 in injector cup body 42. Alternatively, in another exemplary embodiment, the change between the first and second outer diameters is not gradual, but rather is abrupt, thereby creating a shoulder or step (not shown) in injector cup body 42.

With particular reference to FIG. 2, in an exemplary embodiment wherein injector cup body 42 includes conical section 58, fuel rail body 20 further includes a complementary conical seat 60 circumscribing opening 40. Seat 60 is configured such that conical section 58 is seated therein when fuel injector cup 16 is inserted into opening 42. Among other potential functions, conical seat 60 is operative to limit the insertion of fuel injector cup 16 within flow channel 22.

As shown in the exemplary embodiment illustrated in FIGS. 2 and 3, fuel injector cup 16 further includes an aperture 62 disposed within injector cup body 42. More specifically, aperture 62 is formed in the side of cup body 42 proximate base 44. However, in other exemplary embodiments, aperture 62 may be formed anywhere in injector cup body 42 that is to be disposed within flow channel 22 of fuel rail 12.

In an exemplary embodiment, aperture 62 serves two principal purposes. First, aperture 62 is configured to provide an access point to inner cavity 52 of injector cup body 42 for heating element 18. More specifically, aperture 62 is configured to allow a portion of heating element 18 to be inserted therethrough and into inner cavity 52. Second, aperture 62 allows fuel to pass from flow channel 22 into inner cavity 52. In another exemplary embodiment, rather than aperture 62 serving as both a fuel inlet and an access point to inner cavity 52 for heating element 18, injector cup body 42 may further include another aperture therein serving solely as a fuel inlet. As will be described in greater detail below, the fuel passing into inner cavity 52 is heated by heating element 18, which serves to improve starting of the engine to which fuel delivery system 10 is coupled.

It should be noted that while the description above is directed to an embodiment of the present invention wherein fuel injector cup 16 is separate and distinct from fuel rail 12, the present invention is not meant to be limited to such an embodiment. Rather, in another exemplary embodiment, fuel injector cup 16 is unitarily-formed with fuel rail 12. As such, fuel injector cup 16 need not be affixed to fuel rail body 20, instead, fuel injector cup 16 is integrally formed with fuel rail body 20. Accordingly, arrangements wherein fuel injector cup 16 is separate and distinct from, or unitarily-formed with, fuel rail 12 are both within the spirit and scope of the present invention.

With reference to FIG. 4, heating element 18 will be described. Heating element 18 is operative to heat the fuel in inner cavity 52 that is provided to a corresponding fuel injector to thereby improve starting of the engine in certain conditions. Accordingly, as briefly described above, when fuel delivery system 10 is assembled, a portion of heating element 18 is disposed within inner cavity 52 of injector cup 16. Heating element 18 may take the form of any number of known heating elements. In an exemplary embodiment illustrated in FIG. 4, heating element 18 comprises a glow plug having, in part, at least one heat radiating component 64.

As shown in FIG. 4, heating element 18, and heat radiating component 64 thereof, in particular, is configured to be inserted through port 38 in fuel rail 12 and aperture 62 in fuel injector cup body 42. Accordingly, in the illustrated embodiment, port 38 and aperture 62 are in substantial alignment with each other. In an exemplary embodiment wherein the fuel injector cup 16 is not substantially perpendicular with fuel rail body 20, but rather is canted off of a perpendicular axis, aperture 62 may not be substantially aligned with port 38, but rather may be slightly offset. In such an embodiment, aperture 62 takes the form of a scallop cut. An aperture having such a shape or cut allows for the insertion of at least a portion of heating element 18 therein when the injector cup angle is such that aperture 62 may not be in exact, or at least substantial, alignment with port 38. Once inserted through each of port 38 and aperture 62, a portion of heat radiating component 64 is disposed in flow channel 22, while another portion of heat radiating component 64 is disposed within inner cavity 52. Accordingly, heating element 18 is plugged directly into the inner cavity of the injector cup, which also contains the inlet of injector 14. Therefore, fuel in both fuel rail 12 and inner cavity 52 of injector cup 16 is heated prior to being supplied to injector 14.

Figure 5:
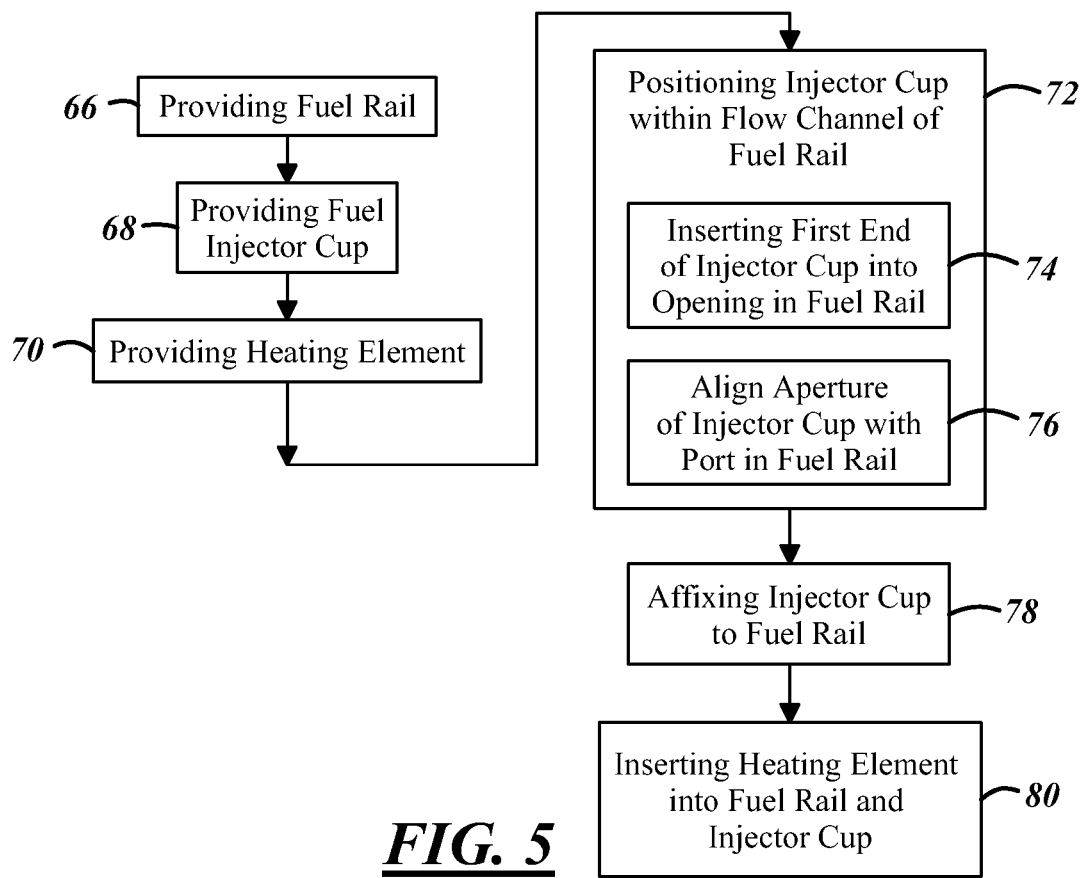
FIG. 5 is a flow diagram of an exemplary embodiment of a method of assembling a fuel delivery system in accordance with the present invention.

With reference to FIG. 5, an exemplary embodiment of a method of assembling fuel delivery system 10 will be described. In a first step 66, a fuel rail 12 having a body 20 is provided. As described in greater detail above, fuel rail body 20 includes a flow channel 22, a port 38, and an opening 40 therein.

In a second step 68, a fuel injector cup 16 is provided. Fuel injector cup 16 includes a cylindrically-shaped body 42 having a base 44 disposed at a first end 46 thereof, and an opening 40 disposed at a second end 50 thereof opposite base 44. Fuel injector cup 16, and body 42 thereof, in particular, further includes an aperture 62 configured to receive a heating element 18.

In a third step 70, a heating element 18 is provided. Heating element 18 includes at least one heat radiating component 64 that is operative to heat fuel in one or both of flow channel 22 of fuel rail 12 and inner cavity 52 of fuel injector cup 16. Accordingly, at least a portion of heating element 18 is configured for insertion through port 38 in fuel rail 12 and aperture 62 in injector cup 16.

In a fourth step 72, first end 46 of fuel injector cup 16 is positioned within flow channel 22 of fuel rail 12. In an exemplary embodiment, step 72 includes the substep 74 of inserting first end 46 of injector cup 16, including base 44, through opening 40 of fuel rail body 20. In one exemplary embodiment, this includes the substep 76 of aligning aperture 62 of injector cup 16 with port 38 in fuel rail 12.

In a fifth step 78, fuel injector cup 16 is affixed to fuel rail body 20. Injector cup 16 may be affixed to fuel rail body 20 using any number of known affixation methods, such as, for example, various welding an brazing processes or techniques.

In a sixth step 80, heating element 18 is inserted through port 38 in fuel rail 12 and aperture 62 in fuel injector cup 16, such that a portion of heating element 18 is disposed within inner cavity 52 of injector cup 16.

When fuel delivery system 10 is assembled in accordance with present invention, a portion of fuel injector cup 16 extends into flow channel 22. Heating element 18 may then be plugged directly into fuel rail 12 and the portion of injector cup 16 disposed within flow channel 22, and inner cavity 52 thereof, in particular. By extending fuel injector cup 16 into flow channel 22, inner cavity 52 creates a heating chamber that is naturally sealed from flow channel 22. Therefore, unlike conventional systems, neither additional heating chambers nor additional sealing components/materials are required. As such, separate components that are typically required to create a heating chamber and to seal the same in conventional systems may be eliminated. By eliminating these components, the manufacturabilty of fuel delivery system 10 is simplified and costs may be reduced.

While the invention has been particularly shown and described with reference to the preferred embodiments thereof, it is well understood by those skilled in the art that various changes and modifications can be made in the invention without departing from the spirit and scope of the invention.

The invention claimed is:

1. A fuel delivery system, comprising:
    a fuel rail having a flow channel therein;
    a fuel injector cup, said injector cup including a base at a first end thereof, an opening at a second end thereof opposite said first end, and an inner cavity disposed between said base and said opening, said first end of said fuel injector cup configured to be disposed within said flow channel; and
    a heating element;
    wherein said fuel rail further includes a port therein configured for receiving said heating element;
    and further wherein said injector cup further includes an aperture disposed in a side thereof, said aperture located between said base and said opening and configured for receiving said heating element.

2. A fuel delivery system in accordance with claim 1 wherein said aperture in said fuel injector cup is disposed at said first end thereof proximate said base.

3. A fuel delivery system in accordance with claim 1 wherein said fuel injector cup is unitarily-formed with said fuel rail.

4. A fuel delivery system in accordance with claim 1 wherein said fuel rail body further includes an opening therein through which said first end of said fuel injector cup body may be inserted.

5. A fuel delivery system in accordance with claim 1 wherein said fuel injector cup is affixed to said fuel rail body.

6. A fuel delivery system in accordance with claim 1 wherein said first end of said injector cup is disposed within said flow channel.

7. A fuel delivery system in accordance with claim 6 wherein said heating element is inserted within said port of said fuel rail and said aperture of said injector cup, and disposed within said inner cavity of said injector cup.

8. A fuel delivery system in accordance with claim 6 wherein said fuel rail further includes an opening therein in which said fuel injector cup is disposed such that said first end of said injector cup is disposed within said flow channel.

9. A fuel delivery system in accordance with claim 6 wherein said second end of said injector cup body is disposed external to said flow channel.

10. An apparatus for use in a fuel delivery system to communicated fuel between a fuel source and a fuel injector, comprising:
    a fuel rail having a flow channel and a port therein, said port configured to receive a heating element; and
    a fuel injector cup having a base at a first end thereof, an opening at a second end thereof opposite said first end, and an inner cavity disposed between said base and said opening, said first end of said fuel injector cup configured to be disposed within said flow channel, said fuel injector cup further including an aperture disposed in a side thereof, said aperture located between said base and said opening and configured to receive a heating element.

11. An apparatus in accordance with claim 10, wherein said fuel injector cup is unitarily-formed with said fuel rail.

12. An apparatus in accordance with claim 10, wherein said fuel rail further includes an opening therein through which said first end of said fuel injector cup may be inserted.

13. An apparatus for use in a fuel delivery system to communicated fuel between a fuel source and a fuel injector, comprising:
    a fuel rail having a flow channel and a port therein, said port configured to receive a heating element;
    a fuel injector cup having a base at a first end thereof, an opening at a second end thereof opposite said first end, and an inner cavity disposed between said base and said opening, said first end of said fuel injector cup configured to be disposed within said flow channel, said fuel injector cup further including an aperture therein configured to receive said heating element; and
    wherein said fuel rail further comprises:
        an opening therein through which said first end of said fuel injector cup may be inserted;
        a first side defining a top side and a second side defining a bottom side;
        a third side disposed between said top and bottom sides at a first end of said fuel rail, and a fourth side disposed between said top and bottom sides at a second end of said fuel rail opposite said first end; and
        a fifth side and a sixth side each disposed between said top and bottom sides and extending between said first and second ends of said fuel rail;
        wherein said opening in said fuel rail is disposed in said bottom side of said fuel rail, and said port is disposed in one of said fourth and fifth sides of said fuel rail.

14. An apparatus in accordance with claim 10 wherein said fuel injector cup is affixed to said fuel rail.

15. An apparatus in accordance with claim 10 wherein said portion of said fuel injector cup configured to be disposed within said flow channel is disposed within said flow channel.

16. An apparatus in accordance with claim 15 wherein said heating element is inserted within said port of said fuel rail and said aperture of said fuel injector cup, and disposed within said inner cavity of said fuel injector cup.

17. An apparatus in accordance with claim 15 wherein said second end of said fuel injector cup is disposed external to said flow channel.

18. An apparatus in accordance with claim 15 wherein said fuel rail further includes an opening therein in which said fuel injector cup is disposed such that said first end of said fuel injector cup is disposed within said flow channel.

19. A method of assembling a fuel delivery system, said method comprising:
    providing a fuel rail having a flow channel, a port, and an opening therein;
    providing a fuel injector cup having a base disposed at a first end thereof, an opening disposed at a second end thereof opposite said first end, and an inner cavity disposed between said base and said opening, said fuel injector cup further including an aperture disposed in a side thereof and located between said base and said opening thereof;
    providing a heating element;

positioning said first end of said fuel injector cup in said flow channel of said fuel rail through said opening in said fuel rail;
affixing said fuel injector cup to said fuel rail;
inserting said heating element through said port in said fuel rail, through said aperture in said side of said fuel injector cup, and into said inner cavity of said fuel injector cup.

20. A fuel delivery system, comprising:
a fuel rail having a flow channel and a port therein;
a fuel injector cup, said injector cup including:
   a base at a first end thereof;
   an opening at a second end thereof opposite said first end;
   an inner cavity disposed between said base and said opening; and
   an aperture disposed therein;
   said first end of said fuel injector cup disposed within said flow channel; and
a heating element disposed within said port of said fuel rail and said aperture of said fuel injector cup, said heating element comprising a heat radiating component wherein a distal end of said heating radiating component is disposed within said inner cavity of said fuel injector cup.

21. A method in accordance with claim 20 wherein said positioning step includes the substep of aligning said aperture in said fuel injector cup with said port in said fuel rail body.

22. A fuel delivery system in accordance with claim 20 wherein said aperture of said fuel injector cup is disposed in a side thereof and located between said base and said opening.

* * * * *

UNITED STATES PATENT AND TRADEMARK OFFICE
CERTIFICATE OF CORRECTION

| | |
|---|---|
| PATENT NO. | : 8,047,182 B2 |
| APPLICATION NO. | : 12/367846 |
| DATED | : November 1, 2011 |
| INVENTOR(S) | : Doherty |

It is certified that error appears in the above-identified patent and that said Letters Patent is hereby corrected as shown below:

Column 10, line 9, delete "claim 20" and insert --claim 19--.

Signed and Sealed this
Seventeenth Day of April, 2012

David J. Kappos
*Director of the United States Patent and Trademark Office*